United States Patent [19]

Mortimer

[11] 4,350,999
[45] Sep. 21, 1982

[54] VIDEO FORMATTED DIGITAL DATA TRANSMISSION METHOD AND APPARATUS

[75] Inventor: Thomas J. Mortimer, Amherst, N.H.
[73] Assignee: Sanders Associates, Inc., Nashua, N.H.
[21] Appl. No.: 127,165
[22] Filed: Mar. 4, 1980
[51] Int. Cl.³ .............................................. H04N 9/46
[52] U.S. Cl. ...................................... 358/147; 358/12
[58] Field of Search ............................... 358/141–147, 358/12, 13, 16; 328/187

[56] References Cited

U.S. PATENT DOCUMENTS 3,507,985 4/1970 Breukink ............................... 358/147
3,723,637 3/1973 Fujio ..................................... 358/145
3,726,992 4/1973 Eguchi .................................. 358/147

4,134,127 1/1979 Campioni ............................ 358/147

OTHER PUBLICATIONS

Techniques of Subtitle Transmission in Television Programmes, e.g. For the Deaf, by Franz Pilz, Conference: World Telecommunication Forum Technical Symposium, Geneva, Switzerland, 10/6–8/75, pp. 3.4.8.1–7.

Primary Examiner—Tommy P. Chin
Attorney, Agent, or Firm—Louis Etlinger; Richard I. Seligman

[57] ABSTRACT

Transmission of digital information during the course of a television signal transmission is provided by transmitting a predetermined number of color burst cycles during the horizontal blanking interval such that logical bits are represented by different, predetermined cycles of color burst.

13 Claims, 2 Drawing Figures

VIDEO FORMATTED DIGITAL DATA TRANSMISSION METHOD AND APPARATUS

BACKGROUND OF THE INVENTION

This invention relates to television systems and more particularly to digital data transmission thereby.

In some presently constituted television systems, digital data signals are transmitted along with the video signal by transmitting this data during one or more horizontal line scan periods during the vertical interval. While this method of transmitting digital data is satisfactory for many applications, it does have its limitations. The vertical interval period is limited to just a few lines per field, on the order of 10 to 15 lines. In the standard NTSC-format, each line is generated in 63.5 microseconds. Since certain equipment to be used to process this information, such as microprocessors are relatively slow, during any 63.5 microsecond period, or one scan line, possibly only four bits per line can be used without the addition of data buffering hardware.

To overcome this data transmission rate limitation, it has been proposed to transmit data during the horizontal blanking interval such that bits of data can be transmitted during each of the horizontal lines of a video scan. In these systems typically a pulse(s) of digital data is transmitted during the horizontal blanking interval and after the chroma burst. While such systems are adequate, they do require an altering of the standard television signal format; namely, the insertion of the data pulses after the chroma burst.

Another method of providing additional information in a television format is disclosed in U.S. Pat. No. 3,723,637. This patent teaches information coding and transmission by amplitude modulating the color burst signal. This system may present a problem in complying with the NTSC standards which specify certain amplitude limitations for the subcarrier signal. It may be difficult to comply with the NTSC standard and still maintain sufficient a.m. modulation for reliable data transmission. Some digital code transmissions may be prohibited because the overall average amplitude of color burst signals will be too low.

Accordingly, it is an object of this invention to provide improved means for data transmission of digital information during the course of a television signal transmission.

SUMMARY OF THE INVENTION

Briefly, data transmission of digital information is provided during the course of a video signal transmission by transmitting a predetermined number of cycles of color burst signal where each such number represents a different code bit. For example, if two bit words are to be transmitted, the code 00 would be transmitted by transmitting eight cycles of color burst signal. The code 10 would be transmitted by transmitting 9 cycles of color burst signal. The code 01 would be transmitted by transmitting 10 cycles of color burst signal and the code 11 would be transmitted by transmitting eleven cycles of color burst signal. This method allows substantial amount of data to be transmitted during each television video field and does not interfere with the video portion of the signal. This method also complies with the NTSC standards for television transmission since the NTSC standards specifically allow for a variation of between eight and eleven cycles of the color subcarrier.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
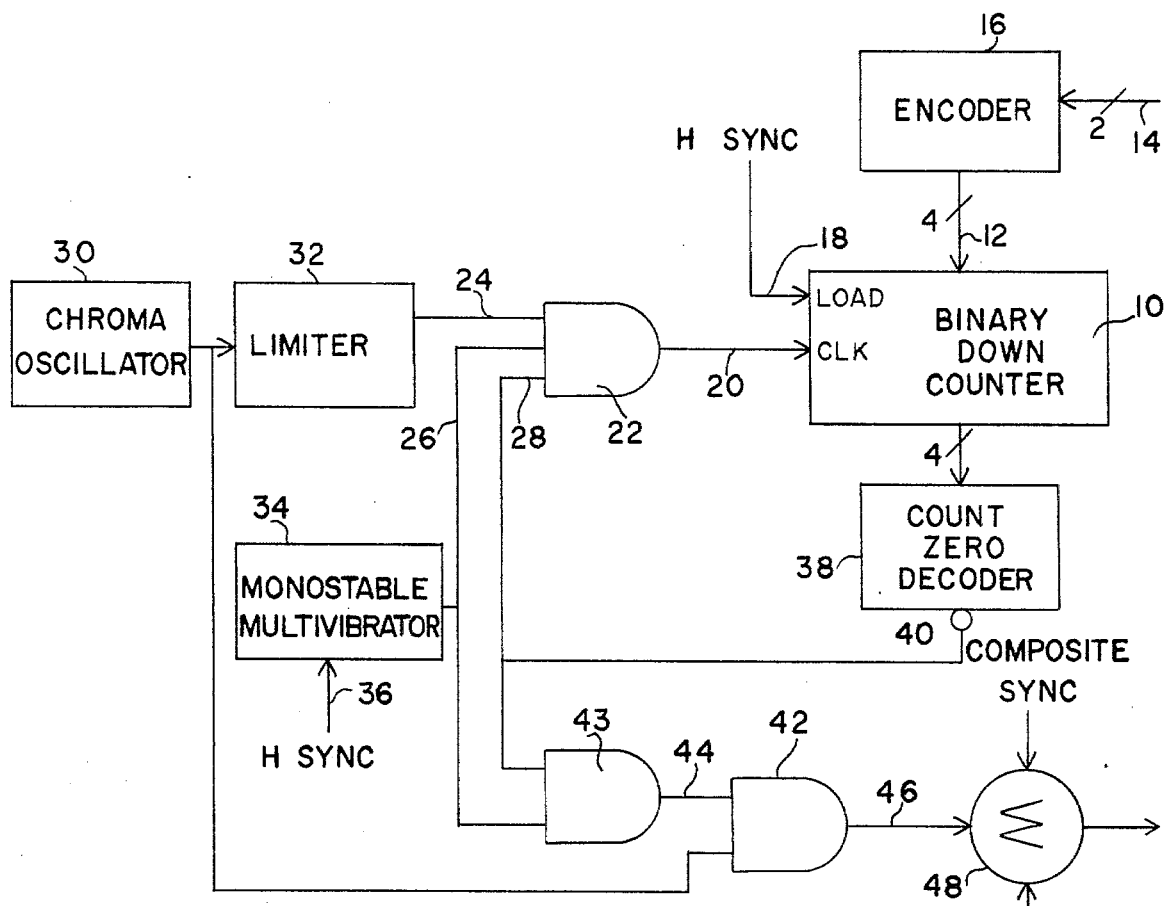
FIG. 1 is a block diagram of a system for generating data in accordance with the teachings of this invention.

Data transmission is achieved during the course of television signal transmission by altering the number of cycles of a color burst signal such that each distinct number of cycles represents a specific two bit digital word. In the embodiment described herein, transmission of eight cycles represents the digital word 00, nine cycles the digital word 10, ten cycles the digital word 01, and eleven cycles the digital word 11. The system as described in FIG. 1 generates the correct amount of cycles of color burst to provide transmission of the desired two bit digital word.

The system includes a binary down counter 10 which receives a four bit binary number from a line 12. The four bit binary number loaded into the binary down counter 10 is either 1000, 1001, 1010, or 1011, that is, the number corresponding to the desired number of cycles of color burst signal to be transmitted. The binary numbers represent the decimal numbers 8, 9, 10, and 11. The code to be transmitted is applied to a pair of lines 14. These numbers are the digital words 00, 10, 01, or 11. These signals are applied to an encoder 16 which provides at output 12 binary equivalents of decimal numbers 8, 9, 10 or 11. For example, if the two bit word 01, applied at line 14, is to be transmitted, encoder 16 receives the word 01 and applies at output 12 the binary equivalent of digital 10, namely, 1010. This binary number is loaded into the binary down counter 10 at the time a horizontal sync pulse is applied to the load input of binary down counter 10 at line 18.

The binary down counter 10 is caused to count down from a clock signal applied thereto via a line 20. The clock signal is derived from an AND gate 22 which has three inputs thereto, 24, 26 and 28. Input 24 to gate 22 is derived from the chroma oscillator 30 of the standard television transmitter. The sinusoidal output from the chroma oscillator 30 is squared up by a limiter 32 and its output applied as input 24 to gate 22. The second input 26 to gate 22 is derived from a monostable multivibrator 34 which is triggered by the horizontal sync signal applied at line 36. The monostable multivibrator 34 provides a gate pulse during which time the predetermined number of cycles of color burst signals are provided. The third input 28 to gate 22 is applied from the output of a count zero decode circuit 38 when the output 40 from count zero decode circuit does not indicate a zero count in the binary down counter 10.

The output from chroma oscillator 30 is also applied to an analog ANDing circuit 42 having as an enabling input thereto an output from an AND gate 43 applied along line 44. The inputs to AND gate 43 are the output of monostable multivibrator 34 and the output from count zero decode circuit 38 indicating that the count in binary down counter 10 is other than zero.

The output 46 from the analog ANDing circuit 42 is the correct number of color burst cycles for the code entered at line 14 and it is applied to a summer 48 to be summed with the composite sync and video signals for transmission.

It is thus seen that after the binary down counter is loaded with the predetermined number indicating the number of cycles of color burst signal to be transmitted, the binary down counter is caused to count down during the gating period established by monostable multivibrator 34 and at a rate determined by the chroma oscillator 30. The binary down counter continues to count down with each chroma pulse until it reaches zero at which time the count zero decode circuit 38 indicates that the zero count has been reached, and, thus, disables the input 28 to the gate 22 to stop the counter. Simultaneously, the analog ANDing circuit 42 which was enabled by the output from AND gate 43 permits a predetermined number of cycles of color burst signal to be applied to the summer 48.

In the example set forth wherein the two bit digital word 01 was applied along line 14, binary down counter was set to 1010 (or decimal 10). The down counter is then caused to count down to zero during which interval 10 cycles of color burst signals from chroma oscillator 30 is output by the analog ANDing circuit 42 to summer 48 to be summed with the composite sync and video signal to provide a composite signal containing both the regular video information and the digital data added thereto.

Figure 2:
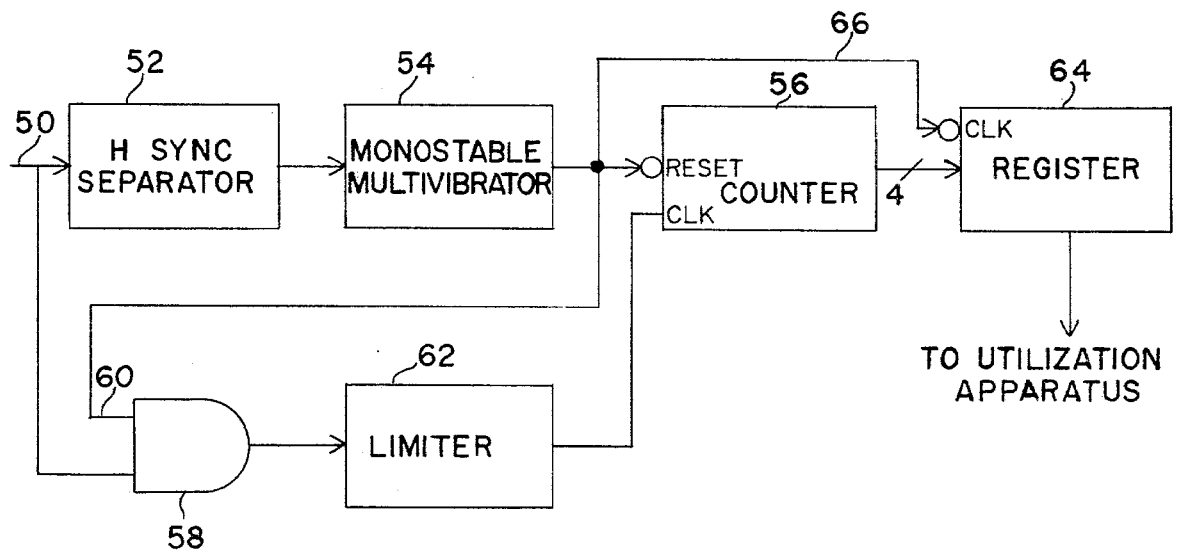
FIG. 2 is a block diagram of a system for receiving data generated by the system of FIG. 1.

Referring now to FIG. 2 of the drawings, there is illustrated thereby a system for receiving the information transmitted by the system of FIG. 1 and for decoding the digital data transmitted thereby. The transmitted signal is received along a line 50 and applied to a horizontal sync separator 52, the output from which is applied to a monostable multivibrator 54, to generate a gate pulse similar timewise to the gate pulse generated by monostable multivibrator 34 of FIG. 1. This pulse is applied to the reset input of a counter 56 which is employed to count the number of color burst cycles. When the monostable output is active (high), the reset condition is removed from counter 56 allowing the counter to increment upon receipt of pulses at its clocking input. The input signal 50 is also applied to an analog ANDing circuit 58 which is enabled by the output from monostable multivibrator 54 along line 60. The output of ANDing circuit 58 is applied to a limiter 62 to generate a square wave or pulses representing the cycles of the color burst signal.

This squared up signal is applied to the clock input of counter 56 which counts the number of color burst cycles received at input 50 during the gating period. In this example, 10 color burst cycles were transmitted and received and, accordingly, counter 56 will count the number 10 from the signal from limiter 62. The output of counter 10, the number 1010, is applied to a register 64 for storing the code number to be applied to apparatus for utilizing such code. A decoding circuit may be applied to the output of register 64 to convert the four possible stored counts (1000, 1001, 1010, 1011) to the originally encoded 2 bit digital words (00, 01, 10 and 11, respectively), if decoded. Register 64 also receives an output from monostable multivibrator 54 to clock into the register the binary count value contained in counter 56 at the time of While I have described above the transmission of a distinct number of color burst cycles for each different two bit data word to be transmitted, this is exemplary only and other coding schemes altering the number of color burst cycles could be used; for example, instead of transmitting a distinct number of cycles for each two bit digital word, an odd number of color burst cycles (9 or 11) could be used to represent a logical zero bit and an even number of chroma cycles (8 or 10) could be used to represent a logical one bit (or vice versa). Furthermore, the manner of implementing the invention set forth herein is exemplary only, and other means of doing same will be apparent to those skilled in the art. Thus, it is to be understood that the embodiment shown is illustrative only and that many variations and modifications may be made without departing from the principles of the invention herein disclosed and defined by the appended claims.

I claim:

1. Apparatus for transmitting digital information in conjunction with standard television signals, comprising:
   a chroma oscillator for providing cycles of color burst signal;
   means coupled to said chroma oscillator for limiting the number of cycles of color burst signal to be transmitted to a predetermined number which varies in accordance with the digital information to be transmitted; and
   means for combining said predetermined number of cycles of color burst signal with synchronization and video signals.

2. Apparatus as defined in claim 1 wherein said cycle limiting means includes means for encoding the digital information to generate a signal representing the number of cycles of color burst signal to be transmitted.

3. Apparatus as defined in claim 2 wherein said cycle limiting means further includes means coupled to said encoding means for gating said chroma oscillator to pass said predetermined number of cycles of color burst signal.

4. A television communication system for communicating digital information in conjunction with standard television information, comprising a television transmission system, including:
   a chroma oscillator for providing cycles of color burst signal; and
   means coupled to said chroma oscillator for varying the number of cycles of color burst signal to be transmitted in accordance with the digital information to be communicated.

5. The system of claim 4, said transmission system further including means for combining said variable color burst signal with other television signal components to generate a composite television signal.

6. The system of claim 5, further including a television reception system including:
   means for receiving said composite television signal; and
   means for decoding the color burst signal to generate the digital information.

7. The system of claim 6 wherein said decoding means includes means for ascertaining the number of cycles of color burst signal.

8. A method of transmitting digital information in conjunction with a standard television signal, comprising the steps of:
   generating a signal at the standard television color subcarrier for providing cycles of color burst signal;

limiting the number of cycles of the color subcarrier to a predetermined number which varies in accordance with the digital information to be transmitted; and combining the limited color subcarrier signal with synchronization and video signals.

9. The method of claim 8 wherein said limiting step includes encoding the digital information to generate signals representing the number of cycles of color subcarrier to be transmitted.

10. The method of claim 9 wherein said limiting step further comprises gating the color subcarrier signal to pass only said predetermined number of cycles of same.

11. The method of claim 8, further including the step of transmitting said combined signal.

12. The method of claim 11, further including receiving said transmitted signal and decoding the color subcarrier to generate the digital information.

13. The method of claim 12 wherein the step of decoding includes ascertaining the number of cycles of color subcarrier received.

* * * * *